United States Patent [19]

Rathburn

[11] 4,125,267

[45] Nov. 14, 1978

[54] WELL PACKER INCLUDING ANTI-EXTRUSION WASHER

[75] Inventor: Lloyd C. Rathburn, Friendswood, Tex.

[73] Assignee: Loomis International, Inc., Pasadena, Tex.

[21] Appl. No.: 814,290

[22] Filed: Jul. 11, 1977

[51] Int. Cl.² ............................................. F16J 15/10
[52] U.S. Cl. ............................ 277/188 A; 277/116.2; 277/168
[58] Field of Search ............... 277/102, 103, 104, 168, 277/116.2, 117, 188 R, 188 A

[56] References Cited

U.S. PATENT DOCUMENTS

| | | | |
|---|---|---|---|
| 2,780,294 | 2/1957 | Loomis | 166/203 |
| 2,934,363 | 4/1960 | Knox | 277/188 A |
| 3,038,542 | 6/1962 | Loomis | 166/204 |
| 3,158,378 | 11/1965 | Loomis | 277/198 |
| 3,195,645 | 7/1965 | Loomis | 166/201 |
| 4,052,112 | 10/1977 | Faber | 277/188 A |

*Primary Examiner*—Robert I. Smith
*Attorney, Agent, or Firm*—Frank S. Vaden, III

[57] ABSTRACT

A packer assembly for sealing against the wall of well pipe including a reverse beveled washer face adjacent a straight resilient packer face, thereby providing an internal gap for vertical extrusion when the packer is radially expanded and, hence, retard vertical extrusion between the hard packer components and the well pipe wall.

7 Claims, 4 Drawing Figures

WELL PACKER INCLUDING ANTI-EXTRUSION WASHER

BACKGROUND OF THE INVENTION

1. Field of the Invention

This invention relates to well pipe packers and more specifically to apparatus for retarding the extruding action of resilient material in such packers, which action in the prior art structure resulted in shortened packer life and occasional packer failure.

2. Description of the Prior Art

The walls of well pipe or casing are plugged or packed off, from time to time, for a number of reasons. For example, a section of well pipe may be packed off to permit pressuring the section to detect leaks in the wall of the well pipe. The structure used to seal off the walls of a well pipe is known as a packer and generally comprises an expansible portion that is activated from a non-expanded size, permitting it to freely pass through the borehole of the well pipe, to a radially enlarged size that accomplishes the desired sealing engagement.

Such packer structures in the prior art comprise a variety of component parts. Generally, however, the packer parts include a combination of metallic and resilient components. One common type includes an expandable segment metallic ring surrounded by a resilient packer sleeve. Another common type includes telescoping metallic parts that squeeze together to cause an intermediate resilient packer element to expand radially.

Many of these structures include top and bottom facings, one or both of which include sloping or irregular contours. These surfaces permit such things as achieving effective sealing between components. An example of a structure including components with contoured facings is shown in U.S. Pat. No. 3,195,645, annular rings 28 and 30.

Note that such contoured surfaces generally permit a slight longitudinal movement of the expandable component as it radially expands and such structure involves two mating surfaces that are similarly contoured.

Although such a structure permits a uniform and even sealing between the mating parts, components at least partially made of resilient or conformable material operating under the high pressure conditions to which they are often subjected are not protected by such design. In fact, such design in many cases accelerates the wearing of such components and even on occasion promotes malfunctioning.

It is therefore a feature of this invention to provide an improved well pipe packer assembly which minimizes the extrusion of resilient components therein when the packer is expanded in place.

It is another feature of this invention to provide an improved well pipe packer assembly which causes resilient components therein to expand radially without overlapping the non-resilient components between the packer and the wall of the well pipe or between segmented parts of expanded non-resilient components.

It is still another feature of the invention to provide an improved well pipe packer assembly including a washer that does not deform under operating pressure nor break or chip and having a surface facing sloping from a thick outer edge to a thinner inner portion and a contiguous straight surface facing on the adjacent resilient packer component for achieving an effective packer seal on radial expansion thereof without peripheral extrusion.

SUMMARY OF THE INVENTION

This invention is directed to well pipe packer apparatus for efficiently sealing a well pipe using at least one component made of resilient material, wherein the material is prevented from extruding around the non-resilient components, and particularly downwardly and/or upwardly at the outer periphery of such components.

The packer apparatus preferably includes a washer surrounding a centralized tool stem which has an inwardly sloping surface such that the thickness of the washer is greater at its outer dimension that at its inner dimension and which further has hardness qualities such that the washer maintains its shape, i.e., does not materially deform, and does not break or chip under operating conditions.

The resilient packer, section has a facing surface adjacent the inwardly sloping surface of the washer which, in the absence of supplied packer pressure (such as by the inward telescoping of non-resilient parts against the resilient section), is substantially straight across (or, at least, closer at the outer dimension of the sloping surface of the washer than at its inner dimension).

A material for the washer material that satisfies the required deformity and brittleness requirements is non-heat treated 4140 steel.

BRIEF DESCRIPTION OF THE DRAWINGS

So that the manner in which the above-recited features, advantages, and objects of the invention, as well as others which will become apparent, are attained and can be understood in detail, a more particular description of the invention briefly summarized above may be had by reference to the embodiments thereof illustrated in the appended drawings, which form a part of this specification. It is to be noted, however, that the appended drawings illustrate only typical embodiments of the invention and are not to be considered limiting of its scope, for the invention may admit to other equally effective embodiments.

In the drawings.

DESCRIPTION OF ILLUSTRATED EMBODIMENTS

Figure 1:
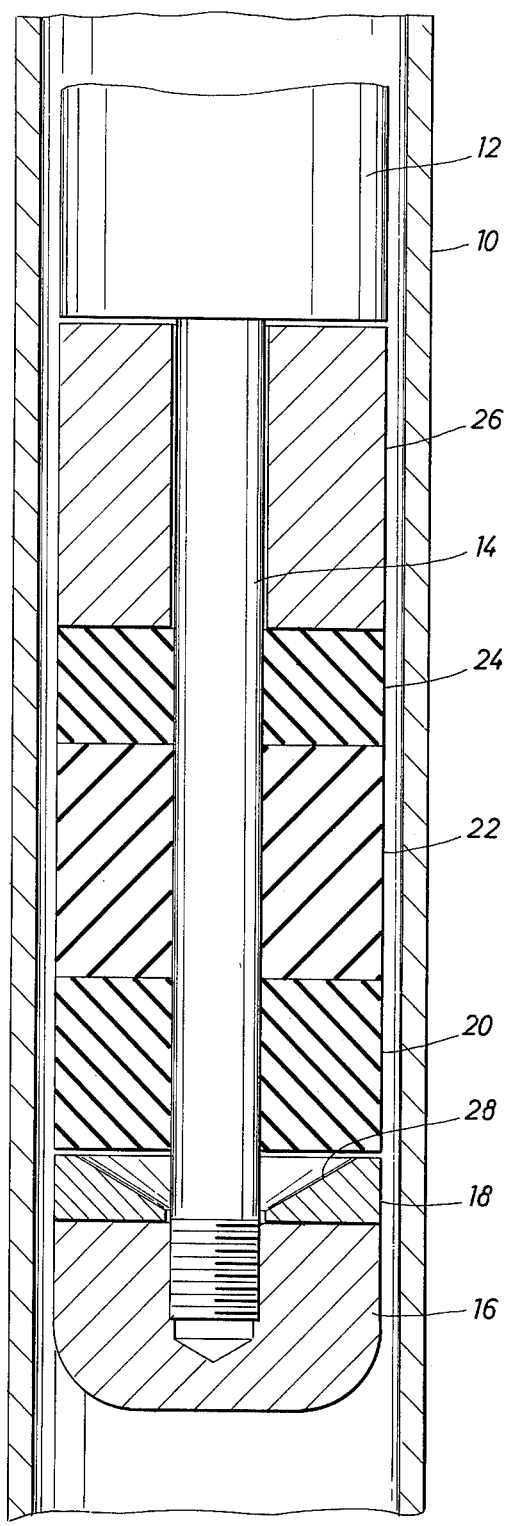
FIG. 1 is a cross sectional view of a preferred packer assembly in accordance with the present invention.

Now referring to the drawings and first to FIG. 1, a packer assembly in accordance with the present invention is shown in place within wall 10 of a well pipe section. The packer assembly includes several components depending from a test tool 12, which is exemplary of various borehole tools that may be employed with a packer assembly. The various components are connected to or held in conjunction with tool stem 14 depending from test tool 12.

At the lowermost part of the packer assembly, heel nut 16 is secured to the threaded end of tool stem 14 via accommodating internal screws thereon. A reverse beveled washer 18, in accordance with the present invention and more fully described hereinafter, is supported by heel nut 16. Washer 18 has a central hole therein for accommodating tool stem 14 therethrough.

In ascending order above washer 18 is hard resilient packer component 20, soft resilient packer component 22, hard resilient ring component 24, and metallic sleeve 26.

It should now be noted that the bottom facing of hard resilient packer component 20 is substantially transverse to tool stem 14, or, in other words, substantially straight across. On the other hand, top facing surface 28 of washer 18 is a sloping surface which slopes inwardly from the greatest washer dimension at the outer thickness of the washer to an internal dimension near the tool stem, this being the thinnest thickness of the washer. Since the adjoining face of component 20 is straight across, it will be apparent that there is a gradually increasing gap between the two facing surfaces as the surfaces progress inwardly.

In operation of the packer assembly illustrated in FIG. 1, sleeve 26 is moved along tool stem 14 toward heel nut 16. This causes the softest resilient material in the combination to squeeze out in a lateral direction to a greater extent than the other resilient components in the combination. Hence, component 22 is pressed against the internal wall of well pipe 10. However, to some extent, resilient components 20 and 24 are also laterally expanded. It may be assumed that all three components combine to effect an effective sealing of the wall of well pipe 10 with respect to the packer assembly, thereby sealing off the space between test tool 12 and the wall of well pipe 10 from the space below the packer assembly within well pipe 10.

The compression of the resilient components, in addition to causing lateral expansion, also causes at least some vertical expansion insofar as there is vertical space to permit this.

If it is assumed that the top facing surface of washer 18 were flat, it may be seen that the resilient material of component 20 would tend to lap over the outer edge of the washer and be extruded by cold flow action down between the packer assembly and wall 10. Such action would tend to break down the material of component 20 and, in time, would cause excessive wear of component 20 and possibly even sealing failure. However, washer 18 includes a reverse beveled surface 28 which inhibits such extrusion from occurring. Instead of extruding down between the packer assembly and the wall of well pipe 10, it tends to extrude to fill the internal gap between washer 18 and component 20. Even though there is lateral expansion of component 20, the radial dimension within the confines of washer 18 are much greater than the radial dimension between the outer limits of washer 18 and the wall of well pipe 10. This being the case, the least resistance for the extruded material is toward the inside rather than the outside. As the material tends to flow inwardly and downwardly, there is actually an upward movement of that part of the resilient material which is radially external of washer 18, rather than the otherwise normal tendency to extrude downwardly along the wall of well pipe 10. Hence, there is no breakdown of the resilient material at outer edge of washer 18 and excess wear due to extrusion is avoided.

Figure 3:
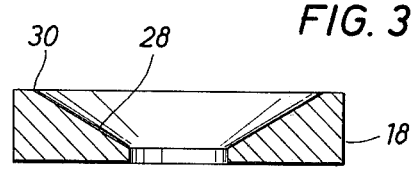
FIG. 3 is a cross sectional view of a preferred washer component of the embodiment of the invention illustrated in FIG. 1.

To avoid a sharp corner at the intersection of sloping surface 28 with the outer edge of washer 18, a preferred embodiment of washer 18 is illustrated in FIG. 3. In this embodiment, the sloping surface reaches its greatest dimension at point 30, which is still inside of the peripheral edge of the washer. Hence, there is a flat dimension at the outer edge of the top facing before the start of slope 28. Note, however, that the radial projection of slope 28 is still greater within the confines of the washer than the dimension which is external to the washer to the wall of the well pipe.

It is most important that under the high pressure conditions which exist in the operation of a packer within a well pipe, the material of washer 18 is such that it does not deform so that slope 28 becomes more horizontal than is illustrated, instead of causing the hard resilient material of component 20 to extrude down slope 28. Should the material be deformed and permit this to occur, then the advantage of the shape of the washer is defeated. The maintenance of the integrity of slope 28 is important.

It is also important that the material not be made so hard to effect this resistance to deformation that it becomes brittle and therefore subject to breakage, chipping or cracking. A material which has been successful has been number 4140 steel which is non-heat treated, although other materials fitting the criteria set forth above could also be used.

Figure 2:
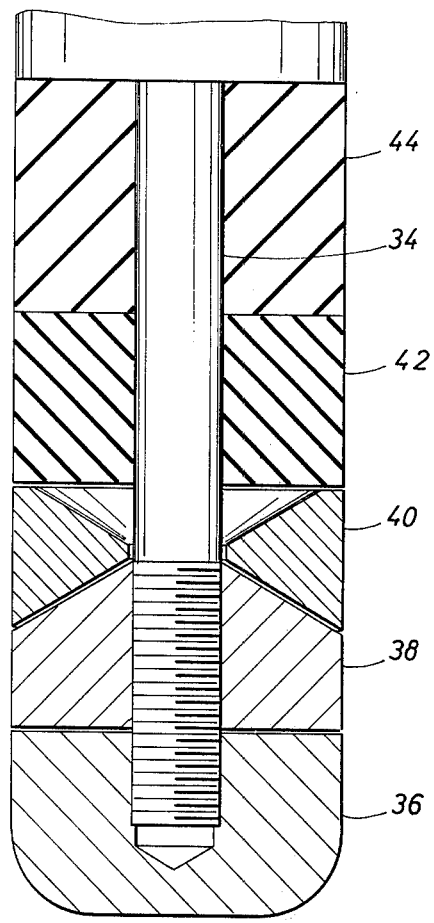
FIG. 2 is a cross sectional view of another preferred packer assembly in accordance with the present invention.

Now referring to FIG. 2, a cross sectional area of another packer assembly embodiment is illustrated. This is a simplified version having only some of the parts shown. Attached to tool stem 34 is heel nut 36. Above this is a backup ring 38 having an upper face which is sloped or beveled downwardly and outwardly from a fairly thick internal dimension to a thinner external dimension. A double reversed beveled or sloped washer 40 is located above backup ring 38. In ascending order thereabove are hard resilient packer 42 and soft resilient packer component 44. Other components may be located above component 44, as illustrated, for example, in FIG. 1.

The bottom surface of component 42 is straight across, as with the bottom surface of component 20 in the embodiment shown in FIG. 1. The top surface of washer 40 is sloped in the same manner as illustrated for washer 18 in the embodiment shown in FIG. 1. Hence, the previously explained extrusion action with respect to hard resilient component 42 is accomplished with respect to the sloping top facing surface of washer 40. The reverse bevel on the bottom side of washer 40 permits it to conform and accommodate to backup ring 38 in a conventional manner without having an effect on the operation of the top surface of the washer with respect to component 42.

Figure 4:
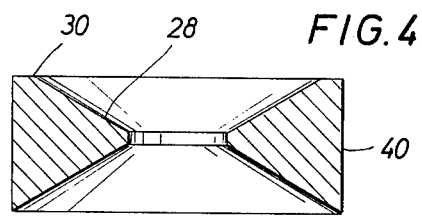
FIG. 4 is a cross sectional view of a preferred washer component of the embodiment of the invention illustrated in FIG. 2.

FIG. 4 shows a preferred embodiment of washer 40. This washer has a slope 28 terminating at point 30, which is slightly internal to the outer peripheral edge of the washer, in a similar manner to the washer illustrated in FIG. 3.

Although the description has been with respect to a test tool for sealing off the wall of the well pipe for test purposes, a packer assembly similar to the above may be used in conjunction with other borehole tools or apparatus. Furthermore, the packer assembly has generally been with regard to components that telescope longitudinally along the borehole to accomplish the radial expansion of the resilient components. Segmented components that radially expand to, in turn, expand resilient components may also advantageously include a component having a washer with a sloping or beveled edge similar to washer 18 or washer 40. Such a structure inhibits extrusion between such segmented components after they have been separated. It should be further noted that the lowermost portion of the assembly in the described embodiments are with respect to a heel nut. This lower unit may be of a different structure, just as the upper unit may be different from test tool 12.

While particular embodiments of the invention have been shown and described, it will be understood that the invention is not limited thereto, since many modifications will be apparent to those skilled in the art and may be made without departing from the spirit and scope hereof.

What is claimed is:

1. In combination with a packer assembly for sealing a well pipe, including
   an upward unit,
   a tool stem carried by the upward unit and depending therefore, and
   a lower unit connected to the tool stem, said upward unit operably connected to move toward said lower unit to apply pressure to a packer unit positioned intermediate between the upward unit and lower unit,
the improvement in a packer unit, comprising
   a washer surrounding the tool stem having an inwardly sloping surface such that the thickness of said washer is greater at its outer dimension than at its inner dimension and having hardness qualities such that said washer maintains shape integrity under packer pressure without breakage,
   a resilient packer section having a surface adjacent the inwardly sloping surface of said washer which, in the absence of applied packer pressure, is closer at the outer dimension of said sloping surface than elsewhere,
   applied packer pressure causing extrusion tendency of said resilient packer section along said washer sloping surface.

2. A packer unit in accordance with claim 1, wherein said washer is made of non-heat treated 4140 steel.

3. A packer unit in accordance with claim 1, wherein said washer is located adjacent the lower unit and said sloping surface is the top surface of said washer.

4. A packer unit in accordance with claim 3, wherein the surface of said resilient packer section adjacent said washer is substantially transverse to said tool stem.

5. A packer unit in accordance with claim 3, wherein the top surface of said lower unit is sloped outwardly downwardly and adjacent bottom surface of said washer conforms thereto.

6. A packer unit in accordance with claim 1, wherein said washer includes a sloping surface that reaches its greatest dimension inside of its outer peripheral edge.

7. A packer unit in accordance with claim 1, wherein said radial dimension of said sloping surface of said washer is greater than the radial dimension from the external limits of said sloping surface and the radial expansion limits of said resilient packer section.

* * * * *